Patented June 19, 1923.

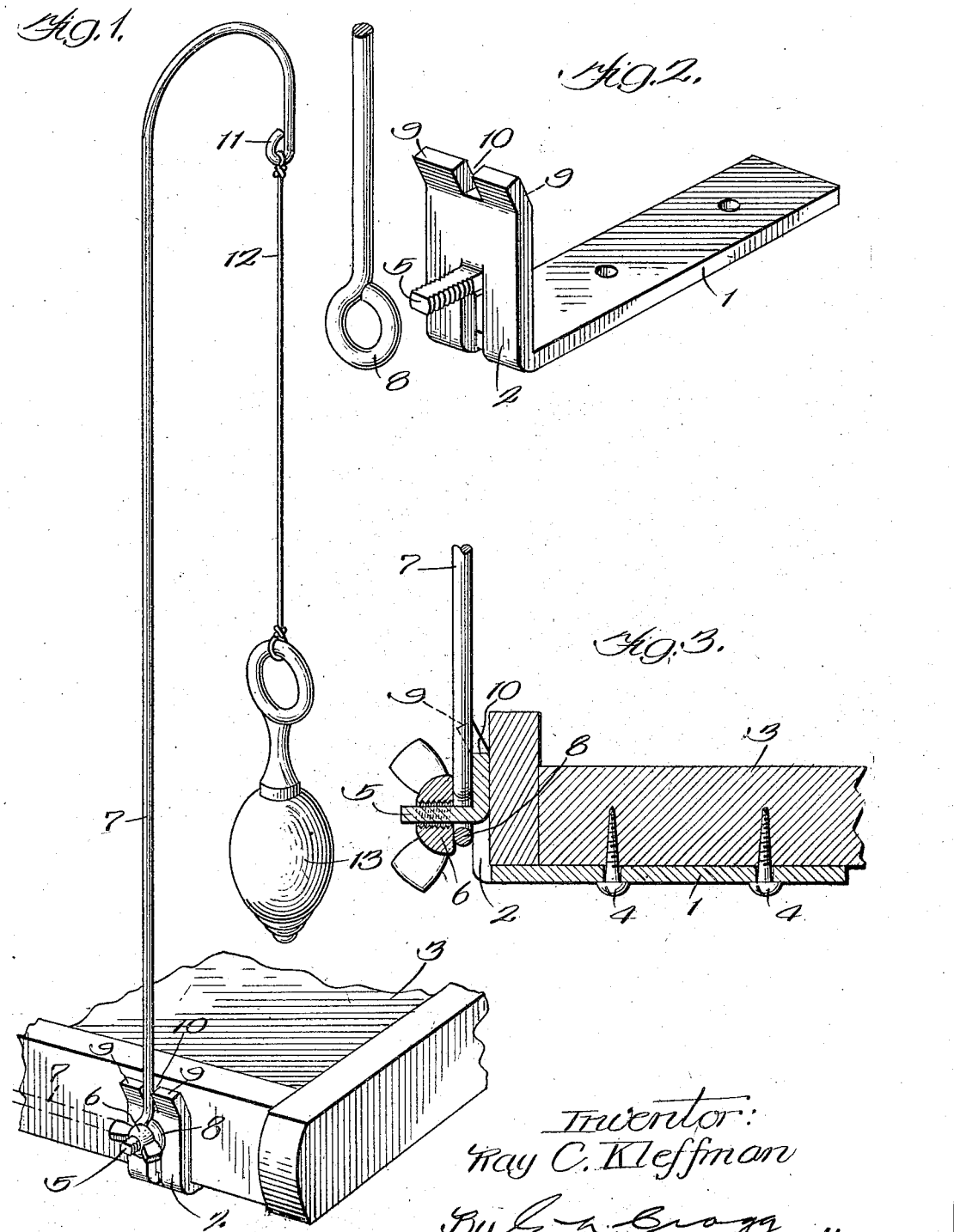

1,459,404

UNITED STATES PATENT OFFICE.

RAY C. KLEFFMAN, OF CHICAGO, ILLINOIS, ASSIGNOR OF ONE-THIRD TO JOHN KLEFFMAN, OF HIBBING, MINNESOTA.

SUPPORTING DEVICE.

Application filed July 5, 1921. Serial No. 482,293.

*To all whom it may concern:*

Be it known that I, RAY C. KLEFFMAN, citizen of the United States, residing at Chicago, in the county of Cook and State of Illinois, have invented a certain new and useful Improvement in Supporting Devices, of which the following is a full, clear, concise, and exact description.

My invention relates to supporting devices and has for its general object the provision of an improved mounting therefor whereby it may readily be held in position. The support itself is preferably in the form of an upright spring rod bent over at its top end and there terminating in an attaching eye. The base end of this support is also desirably formed with an eye which receives a suitable fastening member such as a threaded bolt having thereon a nut by which the base end of the support is clamped in place. As the device is preferably formed, the threaded bolt is provided with an angular extension of a supporting bracket, this extension being stamped out of the bracket and thereafter threaded. The side of the bracket from which the bolt extends preferably has its upper margin bent toward the support, there being a slot formed lengthwise of the support and in the bent top portion of the bracket through which the support passes so that it is prevented from turning either to the right or to the left even though the clamping nut may be somewhat loose. When it is desired to turn the support to a horizontal position the clamping nut is merely loosened sufficiently to permit the support to be withdrawn from the aforesaid slot and thereafter turned whereupon the clamping nut is tightened to hold the support in its new position.

The device of my invention is of particular service for supporting children's toys, the support having a convenient location upon the swinging shelf of a baby's high-chair.

I will explain my invention more fully by reference to the accompanying drawing showing the preferred embodiment thereof and in which Fig. 1 is a perspective view showing a portion of the shelf of a baby's high-chair with the support of my invention mounted thereon; Fig. 2 is another perspective view showing the bracket and the base end of the support in separated relation; and Fig. 3 is a sectional view on line 3—3 of Fig. 1.

Like parts are indicated by similar characters of reference throughout the different figures.

The mounting bracket has a long arm 1 and a short arm 2. As the invention is illustrated the long arm of the bracket underlies the shelf 3 of a baby's highchair and is held against the bottom of this shelf by means of screws 4 passing through the bracket arm 1 into the board of the shelf. The upright arm 2 of the bracket is snugly held against the front face of the shelf. An angular extension 5 is stamped or struck out of the bracket side 3 to be at right angles thereto, this extension having threads formed thereon as illustrated most clearly in Fig. 2 for the reception of a clamping nut 6 which is preferably a wing nut. The support proper is preferably in the form of an elongated spring rod 7 formed with an eye 8 in its base end, the bolt 5 passing through this eye. The nut 6, threaded upon the bolt, may clamp the eye against the bracket side 2 whereby the support may be held in any position to which it may be adjusted. The upper end of the bracket side 2 is turned outwardly as indicated at 9 to overlie the bolt 5, this overturned end of the bracket side 3 having a bolt 10 formed therein in vertical alignment with the bolt and of a width just sufficient freely to receive the spring rod 7. The rod may thus be securely held in an upright position even though the clamping nut 6 does not happen to be in very close clamping engagement with the eye 8 of the rod.

Whenever it is desired to support the rod in any other position, the nut 6 is loosened sufficiently to permit the removal of the rod 7 from the slot 10 whereafter said rod may be turned to the selected position in which it is held when the clamping nut is very tightly screwed into rod clamping position. The upper end of the supporting rod 7 may be suitably formed for the attachment thereto of the object that is to be supported thereby.

As illustrated, the upper end of the rod is curved and returned slightly, the upper extremity of the rod being curled into an eye 11 through which an attaching string 12 may be passed and to which such string may be tied. The toy 13 or other object which is to be supported may have the lower end of the string tied thereto. In the preferred embodiment of the invention the string 12 is an elastic cord so that the infant may pull the toy in the various positions permitted by the flexibility and resilience of the support and the elasticity of the cord.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

A supporting device including a rod; a mounting bracket for the rod having an upright side whose upper end is bent toward the rod, this bent upper end portion of the bracket having a slot formed therein to receive the rod adjacent its mounted end to prevent the rod from being swung upon its mounting; a bolt struck from and carried by the upright side of the bracket; and a nut upon the bolt for clamping the rod between it and the bracket.

In witness whereof, I hereunto subscribe my name this thirtieth day of June, A. D. 1921.

RAY C. KLEFFMAN.